(12) United States Patent
Books et al.

(10) Patent No.: US 9,187,100 B2
(45) Date of Patent: Nov. 17, 2015

(54) HYBRID POWER TRAIN FLEXIBLE CONTROL INTEGRATION

(75) Inventors: Martin T. Books, Columbus, IN (US); Thomas Dollmeyer, Columbus, IN (US); Jean Patrick Rich, Georgetown, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 12/972,653

(22) Filed: Dec. 20, 2010

(65) Prior Publication Data

US 2012/0158225 A1  Jun. 21, 2012

(51) Int. Cl.
| | |
|---|---|
| *B60W 20/00* | (2006.01) |
| *B60W 10/08* | (2006.01) |
| *B60W 10/06* | (2006.01) |
| *G06F 19/00* | (2011.01) |
| *B60W 50/00* | (2006.01) |
| *B60W 50/04* | (2006.01) |

(52) U.S. Cl.
CPC ............ *B60W 50/00* (2013.01); *B60W 50/045* (2013.01); *B60W 10/06* (2013.01); *B60W 10/08* (2013.01); *B60W 20/00* (2013.01); *B60W 2050/0008* (2013.01); *B60W 2050/0045* (2013.01); *B60W 2710/105* (2013.01); *Y02T 10/6286* (2013.01)

(58) Field of Classification Search
CPC ... B60W 50/00; B60W 50/045; B60W 10/06; B60W 10/08; B60W 20/00; Y02T 10/6286
See application file for complete search history.

(56) References Cited

U.S. PATENT DOCUMENTS

| | | | | | |
|---|---|---|---|---|---|
| 3,617,717 | A | * | 11/1971 | Smith | 700/8 |
| 4,926,105 | A | * | 5/1990 | Mischenko et al. | 318/800 |
| 5,134,349 | A | * | 7/1992 | Kruse | 318/400.34 |
| 6,295,500 | B1 | * | 9/2001 | Cullen et al. | 701/93 |
| 6,378,636 | B1 | * | 4/2002 | Worrel | 180/65.25 |
| 6,464,026 | B1 | * | 10/2002 | Horsley et al. | 180/65.25 |
| 6,574,535 | B1 | * | 6/2003 | Morris et al. | 701/22 |
| 6,616,575 | B1 | * | 9/2003 | Lorentz | 477/115 |
| 6,760,655 | B2 | * | 7/2004 | Matsubara et al. | 701/54 |

(Continued)

FOREIGN PATENT DOCUMENTS

| | | | |
|---|---|---|---|
| DE | 102006019031 A1 | * | 10/2007 |
| FR | 2966411 | * | 4/2012 |
| FR | 2966411 A1 | * | 4/2012 |

*Primary Examiner* — John R Olszewski
*Assistant Examiner* — Jean-Paul Cass
(74) *Attorney, Agent, or Firm* — Taft, Stettinius & Hollister LLP (57) ABSTRACT

A system includes a hybrid power train having an internal combustion engine and an electrical torque provider that combine to provide a total machine torque. The system includes a controller that functionally executes operations to control the hybrid power train. The controller interprets a total machine torque target value and determines a torque contribution for each of the internal combustion engine and the electrical torque provider in response. The controller interprets a supplemental torque contribution value, and controls the internal combustion engine and the electrical torque provider in response to the torque contributions and the supplemental torque contribution value. The supplemental torque contribution value is applied as a limiting value, a target value, or a prescribed ratio for one or both of the torque contributions.

20 Claims, 3 Drawing Sheets

(56) References Cited

U.S. PATENT DOCUMENTS

| | | |
|---|---|---|
| 6,853,893 B2 | 2/2005 | Corcione et al. |
| 6,862,511 B1 | 3/2005 | Phillips et al. |
| 6,907,337 B2 | 6/2005 | Phillips et al. |
| 7,024,140 B2 * | 4/2006 | Masuda et al. ............ 399/258 |
| 7,275,610 B2 | 10/2007 | Kaung et al. |
| 7,340,339 B1 * | 3/2008 | Fabry et al. ............... 701/104 |
| 7,421,321 B2 * | 9/2008 | Breed et al. .............. 701/33.6 |
| 7,596,446 B1 * | 9/2009 | Sakayanagi et al. ....... 701/105 |
| 7,599,780 B2 * | 10/2009 | Whitney et al. ........... 701/102 |
| 7,758,468 B2 | 7/2010 | Vafidis et al. |
| 7,826,939 B2 | 11/2010 | Liu et al. |
| 8,060,267 B2 * | 11/2011 | Tamai et al. ................ 701/22 |
| 8,103,395 B2 * | 1/2012 | Bissontz ...................... 701/22 |
| 8,126,604 B2 * | 2/2012 | McGrogan et al. .......... 701/22 |
| 8,204,639 B2 * | 6/2012 | Jinno et al. .................. 701/22 |
| 2003/0054920 A1 * | 3/2003 | Berger et al. ................ 477/70 |
| 2003/0216847 A1 * | 11/2003 | Bellinger ..................... 701/51 |
| 2004/0099454 A1 * | 5/2004 | Hughes ...................... 180/65.2 |
| 2004/0174125 A1 | 9/2004 | Wilton et al. |
| 2005/0256631 A1 * | 11/2005 | Cawthorne et al. .......... 701/99 |
| 2006/0025906 A1 * | 2/2006 | Syed et al. ................... 701/22 |
| 2007/0056272 A1 * | 3/2007 | Dollmeyer et al. .......... 60/297 |
| 2008/0129243 A1 * | 6/2008 | Nashiki ....................... 318/701 |
| 2008/0236921 A1 * | 10/2008 | Huseman ..................... 180/165 |
| 2008/0249745 A1 * | 10/2008 | Heap et al. .................. 702/183 |
| 2009/0082170 A1 * | 3/2009 | Heap ............................ 477/3 |
| 2009/0118084 A1 * | 5/2009 | Heap et al. ................... 477/5 |
| 2009/0215586 A1 * | 8/2009 | Kresse ......................... 477/110 |
| 2010/0078234 A1 * | 4/2010 | Bissontz ..................... 180/65.24 |
| 2010/0082192 A1 * | 4/2010 | Hofbauer ..................... 701/22 |
| 2010/0138090 A1 * | 6/2010 | Jinno et al. .................. 701/22 |
| 2011/0083309 A1 * | 4/2011 | Kshatriya .................... 29/401.1 |
| 2011/0083918 A1 * | 4/2011 | Kshatriya .................... 180/65.26 |
| 2011/0087392 A1 * | 4/2011 | Kshatriya .................... 701/22 |
| 2011/0125390 A1 * | 5/2011 | Bellinger et al. ............ 701/104 |
| 2011/0153128 A1 * | 6/2011 | Wright et al. ................ 701/22 |
| 2011/0224858 A1 * | 9/2011 | Bissontz ...................... 701/22 |
| 2011/0224877 A1 * | 9/2011 | Faucett et al. ................ 701/56 |
| 2011/0231045 A1 * | 9/2011 | Bissontz ...................... 701/22 |
| 2011/0231046 A1 * | 9/2011 | Bissontz ...................... 701/22 |
| 2012/0010767 A1 * | 1/2012 | Phillips et al. ............... 701/22 |
| 2012/0035796 A1 * | 2/2012 | Jeon et al. .................... 701/22 |
| 2012/0046812 A1 * | 2/2012 | Sujan et al. .................. 701/22 |

* cited by examiner

HYBRID POWER TRAIN FLEXIBLE CONTROL INTEGRATION

BACKGROUND

The technical field generally relates to control systems for hybrid power trains. Hybrid power trains utilize more than one power source to generate the torque and power needed to meet the current demands for the application in which the hybrid power train is installed. The various power sources and peripheral devices may be supplied by a number of different manufacturing entities. Various devices may include electronic controls that manage the sensors and actuators related to each device. Further, some system manufacturers prefer to control some devices that are not directly supplied by the system manufacturer. As an example, a transmission manufacturer may wish to control the torque output of the engine and/or motor portions of a hybrid power train, either continuously or intermittently.

Adding control from a manufacturer for a device that is not supplied by the manufacturer creates a complex controls environment. Control elements provided on separate computing devices introduce potential lag periods within the control loop. The lag periods may be managed by using synchronous datalink communications and/or dedicated hardware communications, but these solutions are expensive and must be customized for each application.

Control elements can be combined into a single electronic device with content contributed by several different manufacturers, but this requires that all manufacturers have access to the controller, which may introduce conflicts in control and ownership of the content of the final controller. Several manufacturers contributing to the content of a single electronic device also introduces complications in manufacturing and limitations in final application design. Further, it may be difficult or impractical to coordinate all manufacturing entities to create software control elements that are compatible, that meet requirements for memory consumption in storage and in real-time operation, that use the correct data types, that are delivered on time and in the correct versions, etc.

Additionally, various system manufacturers have differing preferences for the amount of control content they wish to contribute. The contributed control content may also vary over time, with the specific application, and/or with a model year for a specific application. A control system for a hybrid power train that is specifically tailored for each manufacturer is expensive, unreliable, and must be updated for each change in the control content contributed by the various manufacturers. However, a control system that does not accept control inputs from various manufacturers will not provide acceptable flexibility to many manufacturers.

Therefore, further technological developments are desirable in this area.

SUMMARY

One embodiment is a unique system for controlling a hybrid power train and integrating a supplemental control signal into the hybrid power train controls.

An exemplary set of embodiments is an apparatus including a torque demand module that interprets a total machine torque target value. The apparatus further includes a primary torque contribution module that determines a first torque contribution corresponding to a first torque provider and a second torque contribution corresponding to a second torque provider. The apparatus further includes a supplemental torque contribution module that interprets one or more supplemental torque contribution values. The apparatus further includes a torque provider control module that controls the first torque provider and the second torque provider in response to the first torque contribution, the second torque contribution, and the supplemental torque contribution value.

Further exemplary embodiments of the apparatus are described following. The apparatus further includes a datalink interposed between the supplemental torque contribution module and the torque provider control module. In an exemplary embodiment, the supplemental torque contribution value is a minimum torque limit for one of the torque providers, a maximum torque limit for one of the torque providers, a minimum torque slew limit for one of the torque providers, a maximum torque slew limit for one of the torque providers, a torque target value for one of the torque providers, and a torque division description for the torque providers.

In another exemplary embodiment, the primary torque contribution module includes real-time feedback control responsive to the total machine torque target value, and the apparatus further includes an elastic limit module that interprets a number of torque limit values. The elastic limit module adjusts one or both of the torque contributions in response to the torque limit values, and the supplemental torque contribution value is received as one or more of the torque limit values. In an additional embodiment, the torque limit values each correspond to a limit priority value, and the elastic limit module further adjusts one or both of the torque contributions in response to the limit priority values.

In another exemplary embodiment, the primary torque contribution module includes real-time feedback control responsive to the total machine torque target value, and the apparatus further includes a protective limit module that interprets a number of protective torque limit values. The protective limit module adjusts one or both of the torque contributions in response to the torque limit values, and the supplemental torque contribution value is received as one or more of the protective torque limit values. In an additional embodiment, the protective torque limit values each correspond a protective limit priority value, and the protective limit module adjusts one or both of the torque contributions in response to the protective limit priority values.

In certain embodiments, the primary torque contribution module includes real-time feedback control responsive to the total machine torque target value. The torque provider control module adjusts the first torque contribution and the second torque contribution in response to the supplemental torque contribution value, where the adjusting is downstream of the real-time feedback control.

Another exemplary set of embodiments is a system, including a hybrid power train that provides a total machine torque, where the hybrid power train includes an internal combustion engine (ICE) and an electrical torque provider. The system further includes a controller, having a torque demand module, a primary torque contribution module, a supplemental torque contribution module, and a torque provider control module. The torque demand module interprets a total machine torque target value. The primary torque contribution module determines an ICE torque contribution and an electrical torque contribution. The supplemental torque contribution module interprets at least one supplemental torque contribution value, and the torque provider control module controls the ICE and the electrical torque provider in response to the ICE torque contribution, the electrical torque contribution, and the supplemental torque contribution value.

Further exemplary embodiments of the system are described following. The torque demand module further interprets the total machine torque target value in response to a signal provided by a first operator controlled input device. The first operator controlled input device includes, in certain embodiments, an accelerator pedal sensor, a cruise control device, a PTO control device, and/or a load request device. In certain embodiments, the supplemental torque contribution module interprets the supplemental torque contribution value in response to a signal provided by a second load input device. The second load input device includes, in certain embodiments, a second accelerator pedal sensor, a second cruise control device, a second PTO control device, a second load request device, and/or a transmission controller.

An exemplary system includes the primary torque contribution module performing real-time feedback control responsive to the total machine torque target value, and the torque provider control module adjusting the ICE torque contribution and the electrical torque contribution in response to the supplemental torque contribution value, where the adjusting is downstream of the real-time feedback control. Another exemplary system includes the electrical torque provider as a motor/generator within one device, or motor with a generator as two devices, where the electrical torque contribution further includes a battery charging generator torque contribution. Yet another exemplary system includes the electrical torque provider including a number of electrical motors, where the electrical torque contribution further includes a torque contribution corresponding to each of the electrical motors.

Yet another exemplary set of embodiments is a method including interpreting a total machine torque target value for a hybrid power train comprising a first torque provider and a second torque provider, determining a first torque contribution corresponding to the first torque provider, and determining a second torque contribution corresponding to the second torque provider. The method further includes receiving a supplemental torque contribution value over a datalink, and controlling the first torque provider and the second torque provider in response to the first torque contribution, the second torque contribution, and the supplemental torque contribution value.

Further exemplary embodiments of the method are described following. The method further includes limiting the first and/or second torque contributions to a minimum value in response to the supplemental torque contribution value. Another exemplary method includes limiting the first and/or second torque contributions to a maximum value in response to the supplemental torque contribution value. Another embodiment includes adjusting the first and second torque contributions to reflect a ratio specified in response to the supplemental torque contribution value. Yet another embodiment includes limiting the first and/or second torque contributions to a rate of change specified in response to the supplemental torque contribution value. In certain embodiments, receiving the supplemental torque contribution value is performed downstream of any real-time feedback control elements used to determine the first torque contribution and the second torque contribution.

In certain embodiments, the supplemental torque contribution value is provided an elastic limit and/or as a protective limit. An exemplary supplemental torque contribution value further includes a priority value, where the method further includes controlling the first torque provider and the second torque provider further in response to the priority value. An exemplary method includes the supplemental torque contribution value further including a battery state-of-charge target, where the method further includes controlling the first torque provider and the second torque provider further in response to the battery state-of-charge target.

Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
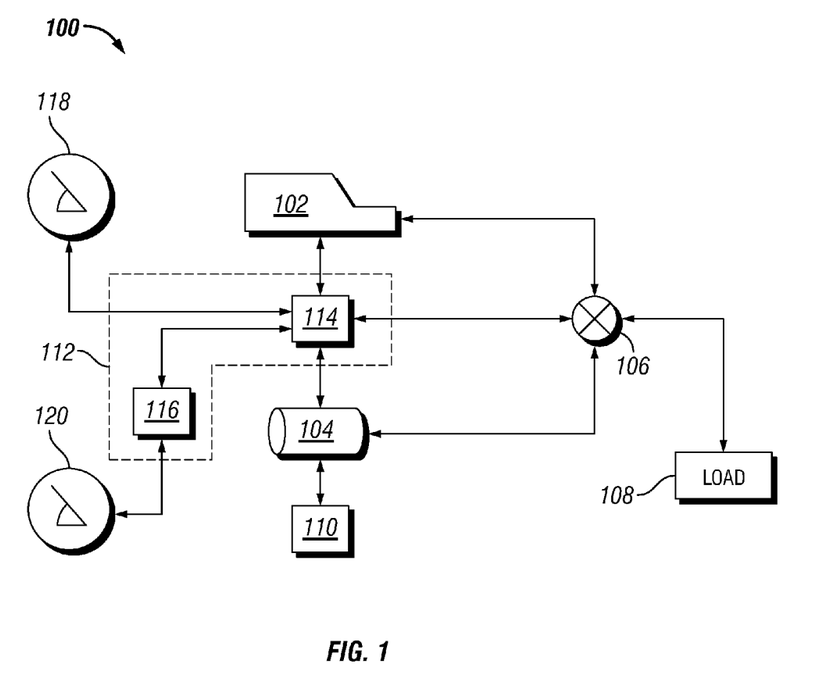
FIG. 1 is a schematic diagram of a system for providing flexible control integration for a hybrid power train.

FIG. 1 is a schematic diagram of a system 100 for providing flexible control integration for a hybrid power train. The system includes a hybrid power train that provides a total machine torque. The hybrid power train includes an internal combustion engine (ICE) 102 and an electrical torque provider 104. The electrical torque provider 104 is illustrated as a motor/generator, but the electrical torque provider 104 may be provided as multiple electrical motors, a separate motor and generator, or any other configuration of electrical torque production understood in the art. The hybrid power train is illustrated as a parallel configuration with a power splitter 106 transferring mechanical power between the engine 102, the electric motor 104, and a load 108. However, the hybrid power train may be a series, series-parallel, or any other arrangement of torque providers understood in the art. Further, the hybrid power train may use any power sources understood in the art, including without limitation internal combustion engines, hydraulic motors or pumps, electric motors, fuel cell devices, or any other power sources.

The engine 102 may be structured to directly power a generator to charge a battery pack 110, or the engine 102 may provide power to the generator through the power splitter 106. The battery pack 110 is electrically coupled to the electrical torque provider 104, and can provide power to or accept power from the electrical torque provider 104. The battery pack 110 may include any other electrical storage device as known in the art, for example and without limitation a hypercapacitor or a fuel cell.

The system further includes a controller 112. The controller 112 includes one or more electronic control devices 114, 116. The electronic control devices 114, 116 include modules structured to functionally execute operations to provide flexible control integration for the hybrid power train. A first control device 114 includes a torque demand module, a primary torque contribution module, and a torque provider control module. In certain embodiments, the first control device 114 further includes an elastic limit module and a protective limit module. The second control device 116 includes a supplemental torque contribution module. While the controller 112 is illustrated as being distributed into two electronic control devices 114, 116, the controller 112 may be organized into more devices, a single device, and/or at least portions of the controller 112 may be implemented in hardware rather than electronic controls.

In certain embodiments, the controller 112 forms a portion of a processing subsystem including one or more computing devices having memory, processing, and communication hardware. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

The controller 112 interprets a first operator controlled input device 118 to determine a total machine torque target value. The total machine torque, in the example of FIG. 1, is the torque supplied to the load 108. However, the total machine torque may be the net torque supplied by the engine 102 and electrical torque provider 104 system, the torque supplied to a transmission, or any other torque value that is downstream of the engine 102 and electrical torque provider 104 system. The operator controlled input device 118 is a device that supplies a load request that is interpretable by the controller 112. The operator controlled input device 118 is exemplary, and any device that supplies a load request, whether operator controlled or not, is contemplated herein. Exemplary input devices include, without limitation, an accelerator pedal sensor, a cruise control device, a PTO control device, and/or a load request device.

In certain embodiments, the controller 112 receives a supplemental load request from a second load input device 120. The second load input device 120 may be a second accelerator pedal sensor, a second cruise control device, a second PTO control device, a second load request device, and/or a transmission controller. The controller 112 determines torque contribution values for each of the torque devices 102, 104 based on the total machine torque required to meet the current torque demand, and adjusts the torque contribution values in response to a supplemental torque contribution value. The supplemental torque contribution value may be determined by the second electronic device 116, and may be determined in response to either the operator controlled input device 118 and/or the second load input device 120. The first electronic device 114 and second electronic device 116 may communicate over a datalink, over a dedicated hardware link, and/or the devices 114, 116 may be included within the same electronic hardware and communicate by passing software parameters and/or memory locations.

The electrical torque contribution determined by the controller 112 includes an electrical torque contribution for each motor 104 in the system 100, an electrical torque contribution for each generator in the system, and/or a battery charging generator torque contribution.

Figure 2:
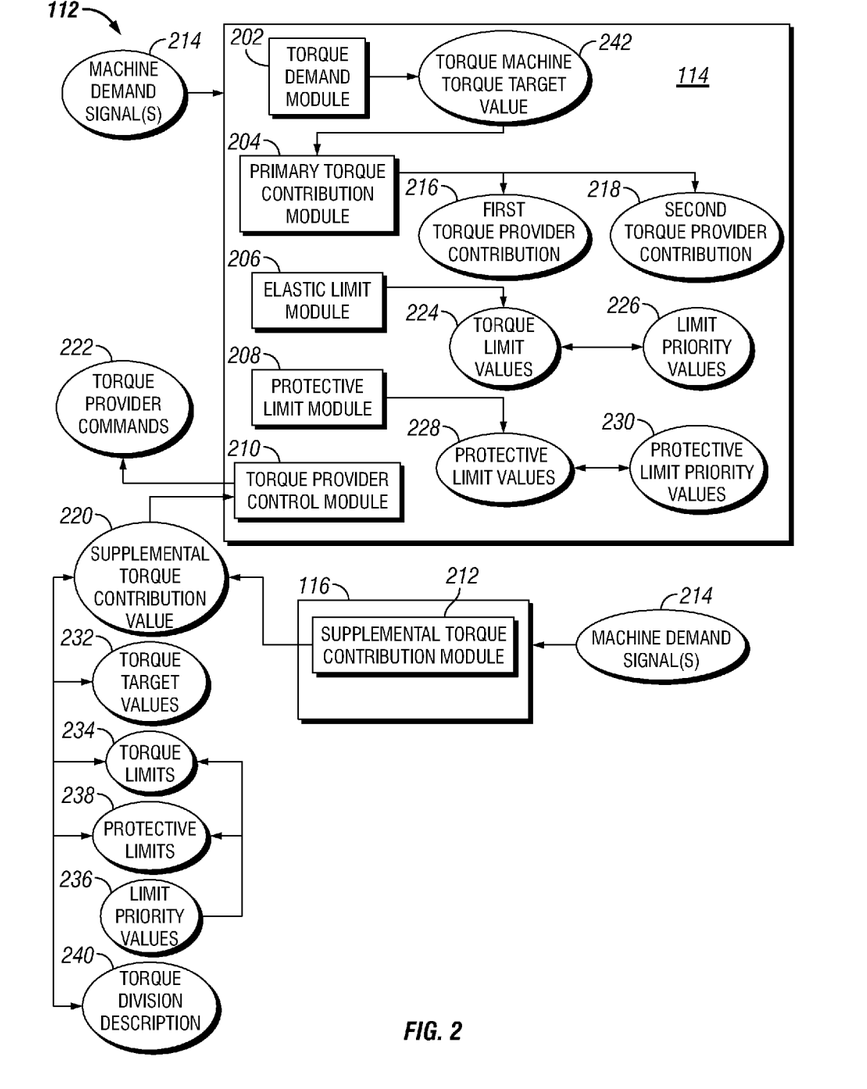
FIG. 2 is a schematic diagram of an apparatus for providing flexible control integration for a hybrid power train.

FIG. 2 is a schematic diagram of a controller 112 for providing flexible control integration for a hybrid power train. Certain operations of the controller 112 are described as interpreting various parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 112 includes a first electronic device 114 and a second electronic device 116. In the illustrated embodiment, the electronic devices 114, 116 are physically separate devices that communicate via a datalink. The first electronic device 114 includes a torque demand module 202 that interprets a total machine torque target value 242. The total machine torque target value 242 is determined by any method understood in the art—for example by determining an operator torque request based upon a current accelerator pedal position, by determining a torque value that will be required to meet or to proceed acceptably toward a speed target (engine speed, vehicle speed, power splitter output shaft speed, etc.), or to meet a published torque value communicated to the first electronic device 114. In certain embodiments, the total machine torque target value 242 is interpreted in response to one or more machine demand signals 214, which may be inputs from an accelerator pedal, cruise control or PTO switch, datalink transmission, or other input known in the art.

The first electronic device 114 further includes a primary torque contribution module 204 that determines a first torque contribution 216 corresponding to a first torque provider and a second torque contribution 218 corresponding to a second torque provider. The primary torque contribution module 204 determines the torque contributions 216, 218 through any means understood in the art. The determination of torque division within a hybrid power train can be made according to any one of a number of criteria that are known to those of skill in the art, and the method of determining the torque division to the first torque contribution 216 and second torque contribution 218 is not important for the purposes of the description herein.

The controller 112 further includes a supplemental torque contribution module 212, positioned on a second electronic device 116 in the illustration of FIG. 2. The supplemental torque contribution module 212 interprets one or more supplemental torque contribution values 220. In certain embodiments, the supplemental torque contribution value 220 is determined in response to one or more of the machine demand signals 214. The machine demand signals 214 used by the supplemental torque contribution module 212 may be the same values used by the torque demand module 202, or they may be different values. For example, the torque demand module 202 may utilize an accelerator pedal sensor signal as a machine demand signal 214, where the supplemental torque contribution module 212 utilizes a transmission torque request signal as a machine demand signal 214.

The supplemental torque contribution module 212 may use different signals 214 to determine a torque request, expressed as the supplemental torque contribution value, which allows the supplemental torque contribution module 212 a controls level to achieve the power, torque, speed, or battery charge requirements for components of the system that may not be considered by the torque demand module 202. For example, and without limitation, the supplemental torque contribution module 212 may request a greater or lesser battery state of charge (SOC) target, request a particular shaft speed at a transmission (e.g. during a gear shift), or request an increased or decreased burden on the electronic torque provider relative to the internal combustion engine torque provider. The supplemental torque contribution module 212 may likewise use the same signal 214 to determine a torque request, but prioritize the use of the electrical side and the internal combustion side, or determine the desired battery SOC in a different manner than the torque demand module 202.

The first electronic device 114 further includes a torque provider control module 210 that controls the first torque provider and the second torque provider in response to the first torque contribution 216, the second torque contribution 218, and the supplemental torque contribution value 220. The supplemental torque contribution value 220 can be utilized in any one or more of several implementations.

In a first implementation, the supplemental torque contribution value 220 is provided as a minimum torque limit 234 for one of the torque providers. For example, the supplemental torque contribution value 220 is a 300 ft-lb minimum torque limit 234 for the engine 102, and the torque provider control module 210 adjusts the torque provider commands 222 to reflect the imposed minimum torque based on the supplemental torque contribution value 220. Alternatively or additionally, the supplemental torque contribution value 220 is provided as a maximum torque limit 234 for one of the torque providers.

The supplemental torque contribution value 220 as an imposed limit is implemented as either a flexible limit 234 or as a protective limit 238. Further, a limit may be implemented with a priority value 236, allowing the torque provider control module 210 to determine the torque provider commands 222 from among competing limits 224, 228, 234, 238. The implementation of a priority scheme and the selection of priority criteria are mechanical steps for one of skill in the art having the benefit of the disclosures herein. An exemplary prioritization scheme includes an enumerated priority index value, with a predetermined hierarchy of priority based on the priority index value. However, any other priority scheme understood in the art is contemplated herein.

In a second implementation, the supplemental torque contribution value 220 is provided as a torque target value 232 for one of the torque providers. The torque target value 232 is utilized by the torque provider control module 210 to determine the torque provider commands 222 for the torque providers. An exemplary embodiment includes the torque provider control module 210 commanding the torque target value 232 for the selected torque device, and commanding the non-selected torque device to make up the difference to achieve the total machine torque target value 242. However, at specific operating conditions a torque limit value 224 or a protective limit value 228 may prevent the torque provider control module 210 from fully commanding the torque target value 232 for the selected torque device. Further, in certain operating conditions, the selected torque device may not be capable of achieving the torque target value 232 supplied by the supplemental torque contribution value 220, and the torque provider control module 210. The inability to achieve the torque target value 232 may be a transient condition or a steady state condition, and the torque provider control module 210 may compensate the inability to meet the torque target value 232 with torque assistance from other torque providers in the system.

In a third implementation, the supplemental torque contribution value 220 is provided as a torque slew limit 234 for one of the torque providers, either a minimum slew limit or a maximum slew limit. The torque slew limit 234 is a rate of change of the torque provided by the selected torque provider. As described preceding, torque slew limits 234 may be provided as elastic or protective limit values, and may be provided with a priority value 236.

In a fourth implementation, the supplemental torque contribution value 220 is provided as a torque division description 240 for the torque providers. The torque division description 240 provides a target division of torque output that is to be provided by the torque providers. In one example, a torque division description 240 may indicate that 60% of the total machine torque target value 242 is to be achieved by an internal combustion engine and 40% is to be achieved by an electric motor. The torque division description 240 may further define the torque division among several electric motors, according to the torque providing components present in the system. The torque provider control module 210 adjusts the torque provider commands 222 in response to the torque division description 240, either meeting the torque division description 240, intentionally failing to meet the torque division description 240 due to a system limit 234, 238, 224, 228, or compensating among the torque providers where the torque division description 240 cannot be achieved under the current operating conditions.

The preceding implementations are described in the alternative for purposes of clarity of description. However, any or all of the implementations of the supplemental torque contribution value 220 may be present in a particular system. Further, other utilizations of the supplemental torque contribution value 220 are possible, and any utilization described herein or understood by one of skill in the art having the benefit of the descriptions herein is contemplated in the present invention.

An exemplary controller 112 includes the primary torque contribution module 204 performing real-time feedback control responsive to the total machine torque target value 242, and the torque provider control module 210 adjusting the ICE torque contribution and the electrical torque contribution (via the torque provider commands 222) in response to the supplemental torque contribution value 220, where the adjusting is downstream of the real-time feedback control.

Real-time feedback control, as used herein, includes any control elements that determine feedback-driven control parameters in response to a determined error value or other control based parameter that determines system response to a set point or desired value. The real-time feedback control may include proportional, integral, and/or derivative-based control, fuzzy logic, neural networks, or any other type of feedback control understood in the art. Because real-time feedback control (or closed loop control) includes time-sensitive parameters, such control is subject to poor performance when information used in the control suffers from lag or is out of phase.

The supplemental torque contribution value 220 may be passed from the second electronic device 116 to the first electronic device 114 over a datalink, which may be an asynchronous datalink since minor time lag or time sequencing concerns do not need to be considered regarding the supplemental torque contribution value 220. Accordingly, in certain embodiments, the controller 112 includes a datalink interposed between the supplemental torque contribution module 212 and the torque provider control module 210.

In another exemplary embodiment, the primary torque contribution module 204 includes real-time feedback control responsive to the total machine torque target value 242, and the controller 112 further includes an elastic limit module 206 that interprets a number of torque limit values 224. The elastic limit module 206 adjusts one or both of the torque contributions 216, 218 in response to the torque limit values 224, and the supplemental torque contribution value 220 includes one or more torque limits 234 that are received as one or more of the torque limit values 224. In an additional embodiment, the torque limit values each correspond to a limit priority value 226, and the elastic limit module 206 further adjusts one or both of the torque contributions 216, 218 in response to the limit priority values 226.

In another exemplary embodiment, the primary torque contribution module 204 includes real-time feedback control responsive to the total machine torque target value 242, and the controller 112 further includes a protective limit module 208 that interprets a number of protective torque limit values 228. The protective limit module 208 adjusts one or both of the torque contributions 216, 218 in response to the torque limit values 224, and the supplemental torque contribution value 220 includes one or more protective limits 238 that are received as one or more of the protective torque limit values 228. In an additional embodiment, the protective torque limit values 228 each correspond to a protective limit priority value 230, and the protective limit module 208 adjusts one or both of the torque contributions 216, 218 in response to the protective limit priority values 230.

In certain embodiments, the primary torque contribution module 204 includes real-time feedback control responsive to the total machine torque target value 242. The torque provider control module 210 adjusts the first torque contribution 216 and the second torque contribution 218 in response to the supplemental torque contribution value 220, where the adjusting is downstream of the real-time feedback control.

The schematic flow diagram and related description which follows provides an illustrative embodiment of performing procedures for flexible control integration of a hybrid power train. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

A procedure for flexible control integration of a hybrid power train includes an operation to interpret a total machine torque target value for a hybrid power train. The hybrid power train includes a first torque provider and a second torque provider. The procedure further includes an operation to determine a first torque contribution corresponding to the first torque provider, and an operation to determine a second torque contribution corresponding to the second torque provider. The procedure further includes an operation to receive a supplemental torque contribution value over a datalink, and an operation to control the first torque provider and the second torque provider in response to the first torque contribution, the second torque contribution, and the supplemental torque contribution value.

In certain embodiments, the procedure includes an operation to limit the first and/or second torque contributions to a minimum value in response to the supplemental torque contribution value. Another exemplary procedure includes an operation to limit the first and/or second torque contributions to a maximum value in response to the supplemental torque contribution value. Yet another exemplary procedure includes an operation to adjust the first and second torque contributions to reflect a ratio specified in response to the supplemental torque contribution value. Another exemplary procedure includes an operation to limit the first and/or second torque contributions to a rate of change specified in response to the supplemental torque contribution value. In certain embodiments, the operation to receive and/or respond to the supplemental torque contribution value is performed downstream of any real-time feedback control elements used to determine the first torque contribution and the second torque contribution.

In certain embodiments, the supplemental torque contribution value is provided as an elastic limit and/or as a protective limit. An exemplary supplemental torque contribution value further includes a priority value, where the procedure further includes an operation to control the first torque provider and the second torque provider further in response to the priority value. An exemplary embodiment includes the supplemental torque contribution value further including a battery state-of-charge target, where the procedure further includes an operation to control the first torque provider and the second torque provider further in response to the battery state-of-charge target.

Figure 3:
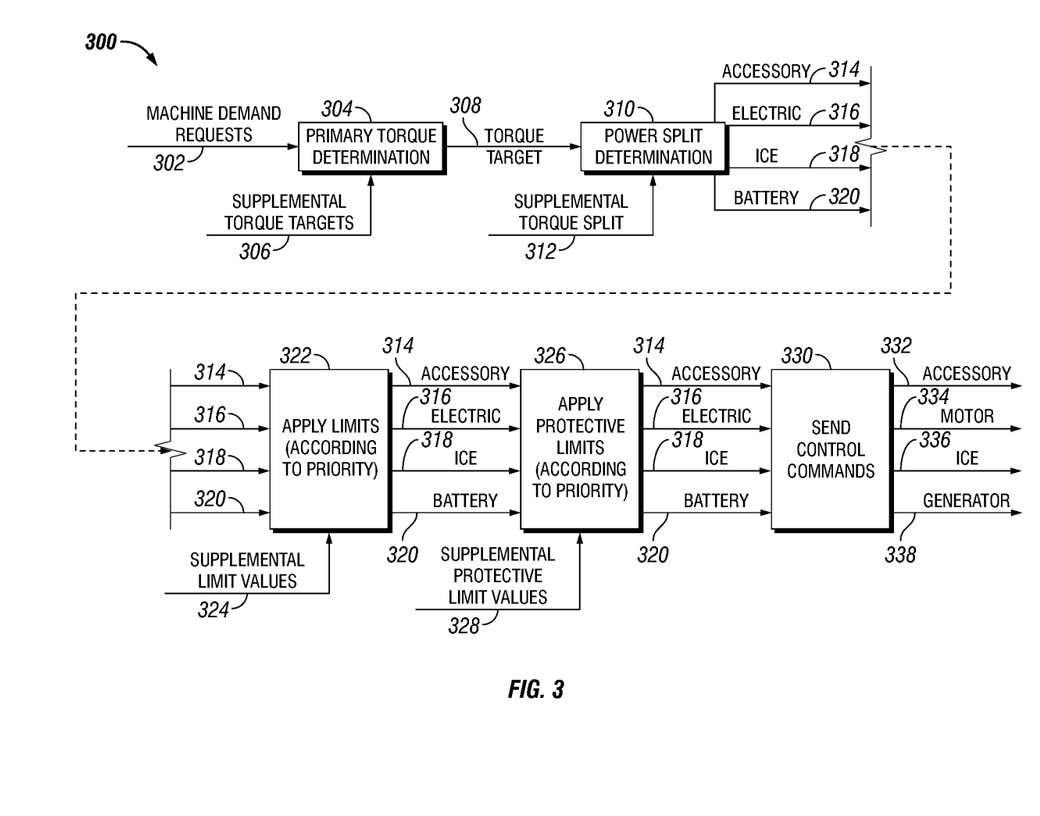
FIG. 3 is schematic representation of a control flow for a hybrid power train.

FIG. 3 is schematic representation of an exemplary control flow 300 for a hybrid power train. The order of operations of the control flow 300 is not of importance to the control flow 300 except as explicitly described. The flow 300 begins with a primary torque determination 304 algorithm referencing one or more machine demand requests 302 and a supplemental torque target 306. The primary torque determination 304 determines a torque target 308 for a machine in response to the requests 302 and the supplemental torque targets 306. The machine demand requests 302 include torque, power, or speed targets for any mechanical component of a system that is responsive to an output torque of a hybrid power train.

The flow 300 continues with a power split determination 310 algorithm referencing the torque target 308 and a supplemental torque split 312 description. The power split determination 310 algorithm determines an accessory command 314, an electric torque command 316, an internal combustion engine torque command 318, and a battery energy flux command 320. One or more of the commands 314, 316, 318, 320 may not be present in certain embodiments. Any determinations within the power split determination 310 may use the supplemental torque target 306 in determining a set point, or use the supplemental torque split 312 to adjust a command 314, 316, 318, 320 downstream of a real-time feedback control element. However, within the loop of any real-time feedback control element within the power split determination 310 the supplemental reference information 306, 312 is not used.

The flow 300 further continues with an apply limits 322 algorithm applying any flexible system limits according to the base hybrid power train control. For example, the base hybrid power train controller may have limits on the battery SOC, the rate of change of torque allowed in the engine or electronic torque components (e.g. for noise or other considerations that are not necessarily hard limits), or for other considerations understood in the art. The apply limits 322 algorithm may apply the provided limits according to priority values, according to a default prioritization scheme, or by any other organization understood in the art. The apply limits 322 algorithm further references the supplemental limit values 324, and applies the supplemental limit values 324 with the base hybrid power train controller limits, according to priority if provided.

The flow 300 further includes an apply protective limits 326 algorithm that applies any protective limits in the base hybrid power train controller. For example, certain system limitations may be applied to avoid destruction of a component, to avoid an emissions deviation, or may be applied in response to a system fault or other off nominal condition. Further, the apply protective limits 326 algorithm references supplemental protective limit values 328, and applies the supplemental protective limit values 328. All of the protective limits applied may be applied with a priority determination where applicable.

The flow 300 continues with a send control commands 330 algorithm that determines final control commands based on the commands 314, 316, 318, 320 as adjusted according to the limit algorithms. The accessory command 332 determines, for example, whether accessory devices are applied as a load to the hybrid power train (e.g. to recover kinetic energy from a vehicle that is slowing down when regenerative braking capacity is otherwise maximized). The motor command 334 provides the specific instructions to an electric motor for final torque output. The internal combustion engine commands 336 provide the specific instructions for the engine actuators (fueling, timing, EGR control, turbocharger control, etc.). The generator commands 338 control the charging of the battery. The commands 332, 334, 336, 338 are exemplary and not exhaustive.

As described preceding, the order of operations in the flow 300 is not limiting. Further, the presence or lack of parameters in the exemplary flow 300 is not limiting. Without limitation, certain considered deviations from the illustrated flow 300 are described. The limiting algorithms 322, 326 may be combined, omitted, or re-ordered. Any of the supplemental parameters 306, 312, 324, 328 may be omitted. In a given embodiment, at least one of the supplemental parameters 306, 312, 324, 328 will be referenced by the flow 300, but no specific supplemental parameter 306, 312, 324, 328 is required, and the positions within the flow 300 where the supplemental parameter 306, 312, 324, 328 is reference may vary. For example, a supplemental parameter 306, 312, 324, 328 may be determined and stored at the beginning of the flow 300 and utilized at any algorithm within the flow 300.

As is evident from the figures and text presented above, a variety of embodiments according to the present invention are contemplated.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
  a first control device connected to a first load input device, wherein the first control device includes:
    a torque demand module structured to interpret a total machine torque target value in response to one or more machine demand signals determined from a first input to the first load input device, wherein the first input is a first set of torque contribution requirements from a first torque provider and a second torque provider;
    a primary torque contribution module structured to determine a first torque contribution corresponding to the first torque provider and a second torque contribution corresponding to the second torque provider in response to the total machine torque target value, wherein the primary torque contribution module comprises real-time feedback control of the first torque provider and the second torque provider in response to the first torque contribution and the second torque contribution;
    a torque provider control module;
  a second control device connected to a second load input device, wherein the second control device includes:
    a supplemental torque contribution module structured to interpret at least one supplemental torque contribution value that adjusts at least one of the first torque contribution and the second torque contribution in accordance with one or more machine demand signals determined from a second input to the second load input device and the second input is a second set of torque contribution requirements from the first and second torque providers that is different from the first input to the first load input device; and
  wherein the torque provider control module is connected to the supplemental torque contribution module with a datalink that transmits the supplemental torque contribution value to the torque provider control module in a time lag with the real-time feedback control of the first torque provider and the second torque provider with the primary torque contribution module, the torque provider control module structured to adjust the real-time feedback control of at least one of the first torque contribution and the second torque contribution by integrating the supplemental torque contribution value outside of and downstream of the real-time feedback control of the first torque provider and the second torque provider with the primary torque contribution module.

2. The apparatus of claim 1, wherein the supplemental torque contribution value comprises at least one torque value selected from the torque values consisting of: a minimum torque limit for one of the first torque provider and the second torque provider, a maximum torque limit for one of the first torque provider and the second torque provider, a minimum torque slew limit for one of the first torque provider and the second torque provider, a maximum torque slew limit for one of the first torque provider and the second torque provider, a torque target value for one of the first torque provider and the second torque provider, and a torque division description for the first torque provider and the second torque provider.

3. The apparatus of claim 1, further comprising an elastic limit module structured to interpret a plurality of torque limit values and to adjust at least one of the first torque contribution and the second torque contribution in response to the torque limit values, and wherein the supplemental torque contribution value is received as one or more of the plurality of torque limit values.

4. The apparatus of claim 3, wherein each of the torque limit values corresponds to one of a plurality of limit priority values, wherein the elastic limit module is further structured to adjust at least one of the first torque contribution and the second torque contribution in response to the limit priority values.

5. The apparatus of claim 1, further comprising a protective limit module structured to interpret a plurality of protective torque limit values and to adjust at least one of the first torque contribution and the second torque contribution in response to the protective torque limit values, and wherein the supplemental torque contribution value is received as one or more of the protective torque limit values.

6. The apparatus of claim 5, wherein each of the protective torque limit values corresponds to one of a plurality of protective limit priority values, wherein the protective limit module is further structured to adjust at least one of the first torque contribution and the second torque contribution in response to the protective limit priority values.

7. A system, comprising:
a hybrid power train providing a total machine torque, the hybrid power train comprising an internal combustion engine (ICE) and an electrical torque provider;
a first control device connected to a first load input device, wherein the first control device includes:
a torque demand module structured to interpret a total machine torque target value in response to one or more machine demand signals from a first input to the first load input device, wherein the first input is a first set of torque contribution requirements of the hybrid powertrain;
a primary torque contribution module structured to determine an ICE torque contribution and an electrical torque contribution in response to the total machine torque target value, wherein the primary torque contribution module comprises real-time feedback control of the ICE in response to the ICE torque contribution and the electrical torque provider in response to the electrical torque contribution;
a torque provider controller module;
a second control device connected to a second load input device, wherein the second control device includes:
a supplemental torque contribution module structured to interpret at least one supplemental torque contribution value that adjusts at least one of the ICE torque contribution and the electrical torque contribution in accordance with one or more machine demand signals from a second input to the second load input device and the second input is a second set of torque contribution requirements of the hybrid powertrain that is different from the first input to the first load input device; and
wherein the torque provider control module is connected to the supplemental torque contribution module with a datalink that transmits the at least one supplemental torque contribution value to the torque provider control module in a time lag with the real-time feedback control of the first torque provider and the second torque provider with the primary torque contribution module, the torque provider control module structured to adjust the real-time feedback control of at least one of the ICE torque contribution of the ICE and the electrical torque contribution of the electrical torque provider by integrating the supplemental torque contribution value outside of and downstream of the real-time feedback control of the of the ICE and the electrical torque provider with the primary torque contribution module.

8. The system of claim 7, wherein the first load input device is an operator controlled input device.

9. The system of claim 8, wherein the operator controlled input device comprises an input device selected from the group consisting of: an accelerator pedal sensor, a cruise control device, a PTO control device, and a load request device.

10. The system of claim 9, wherein the second load input device comprises a load input device selected from the group consisting of: a second accelerator pedal sensor, a second cruise control device, a second PTO control device, a second load request device, and a transmission controller.

11. The system of claim 7, wherein the electrical torque provider comprises one of a motor/generator within one device and a motor with a generator as two devices, wherein the electrical torque contribution further includes a battery charging generator torque contribution.

12. The system of claim 7, wherein the electrical torque provider comprises a plurality of electrical motors, wherein the electrical torque contribution further comprises a torque contribution corresponding to each of the electrical motors.

13. A method, comprising:
interpreting a total machine torque target value with a first control device for a hybrid power train comprising a first torque provider and a second torque provider, wherein the total machine torque target value is interpreted in response to one or more machine demand signals from a first input to a first load input device, wherein the first input is a first set of torque contribution requirements of the hybrid powertrain;
determining a first torque contribution corresponding to the first torque provider with the first control device in response to the total machine torque target value;
determining a second torque contribution corresponding to the second torque provider with the first control device in response to the total machine torque target value;
providing real-time feedback control of the first torque provider according to the first torque contribution and the second torque provider according to the second torque contribution with the first control device;
receiving a supplemental torque contribution value over a datalink connected to a second control device in a time lag with the real-time feedback control of the first torque provider and the second torque provider, wherein the supplemental torque contribution value adjusts at least one of the first torque contribution and the second torque contribution in accordance with one or more machine demand signals from a second input to a second load input device connected to the second control device and the second input is a second set of torque contribution requirements of the hybrid powertrain that is different from the first input to the first load input device; and
controlling the first torque provider and the second torque provider by integrating the supplemental torque contribution value outside of and downstream of the real-time feedback control of the first torque provider according to the first torque contribution and the second torque provider according to the second torque contribution.

14. The method of claim 13, further comprising limiting one of the first and second torque contributions to a minimum value in response to the supplemental torque contribution value.

15. The method of claim 13, further comprising limiting one of the first and second torque contributions to a maximum value in response to the supplemental torque contribution value.

16. The method of claim 13, further comprising adjusting the first and second torque contributions to reflect a ratio specified in response to the supplemental torque contribution value.

17. The method of claim 13, further comprising limiting one of the first and second torque contributions to a rate of change specified in response to the supplemental torque contribution value.

18. The method of claim 13, wherein the supplemental torque contribution value is provided as one of an elastic limit and a protective limit.

19. The method of claim 18, wherein the supplemental torque contribution value further comprises a priority value, the method further comprising controlling the first torque provider and the second torque provider further in response to the priority value.

20. The method of claim 13, wherein the supplemental torque contribution value further comprises a battery state-of-charge target, the method further comprising controlling the first torque provider and the second torque provider further in response to the battery state-of-charge target.

* * * * *